June 22, 1937.   J. F. KNAPP   2,084,690
EARTH MOVER
Original Filed March 27, 1934
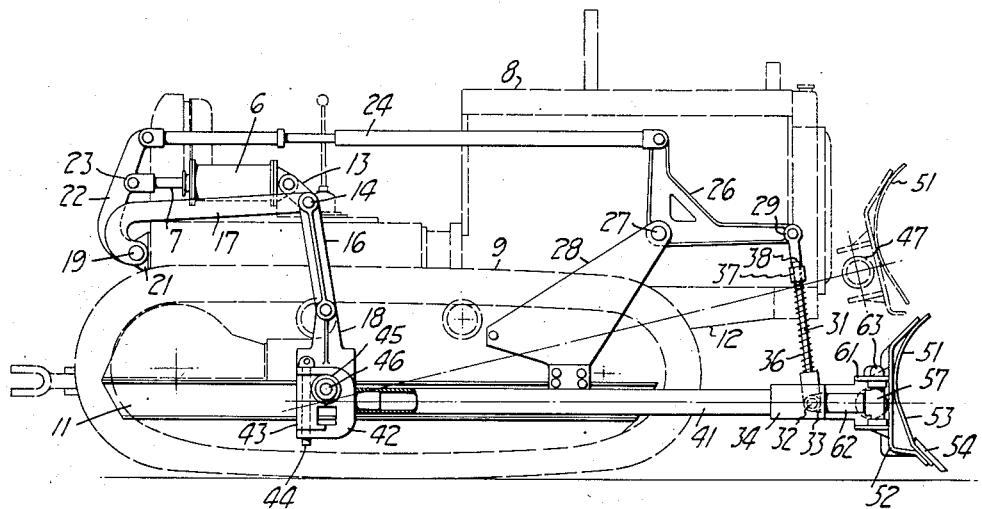
FIG_1_
FIG_2_
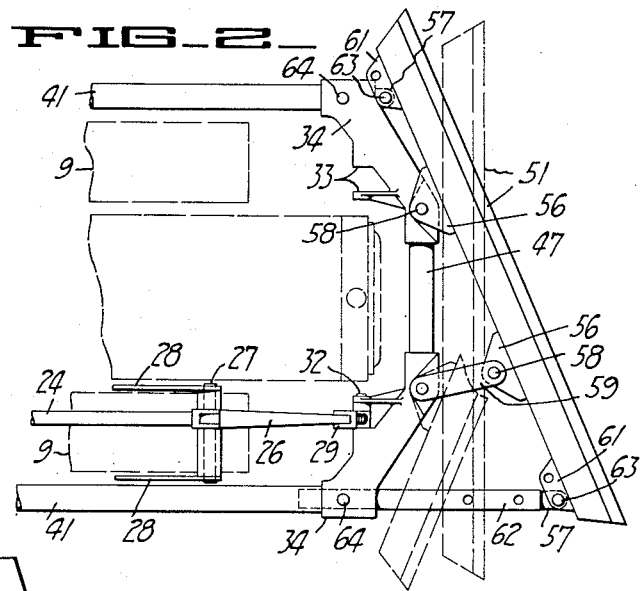
FIG_3_
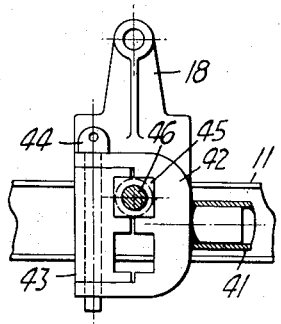
FIG_4_
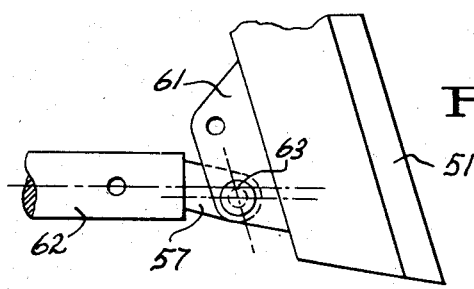
INVENTOR.
John F. Knapp
BY Robert H. Eckhoff
ATTORNEY.

Patented June 22, 1937

2,084,690

UNITED STATES PATENT OFFICE 2,084,690

EARTH MOVER

John F. Knapp, Oakland, Calif., assignor to American Tractor Equipment Corporation, a corporation of California Original application March 27, 1934, Serial No. 717,592. Divided and this application November 11, 1935, Serial No. 49,255

5 Claims. (Cl. 37—144)

This is a division of application Serial Number 717,592 filed March 27, 1934.

My invention relates to machinery useful in conjunction with earth moving, excavating, grading and the like, and is especially concerned with an apparatus adapted to be propelled by a vehicle such as a tractor, and to be controlled by the operator of the tractor.

An object of my invention is to provide an earth mover of large capacity and correspondingly of considerable ruggedness.

Another object of my invention is to provide an earth mover carried by a tractor in such a manner that the load placed on the tractor is carried entirely by the truck frames rather than through the equalizer bar or spring.

An additional object of my invention is to provide an earth mover carried by a tractor almost directly beneath the forward end thereof to shorten the moment arm of the mover on the tractor.

A further object of my invention is to provide an earth mover which can be readily adjusted in various positions.

The foregoing and other objects are attained in the embodiment of the invention shown in the drawing, in which Figure 1 is a side elevation of a tractor carrying one form of earth mover of my invention.

Figure 2 is a plan view of the forward end of the tractor and earth mover.

Figure 3 is a fragmentary view showing the connection to the tractor sub-frames.

Figure 4 is a fragmentary view of a connection for supporting the mold board.

In the form shown in the drawing there is disclosed a mechanism adapted to be actuated by a hydraulic displacement mechanism, including cylinders 6 and piston rods 7, deriving its power from a pump unit mounted on tractor 8. The tractor includes opposite tracks 9 carried by truck frames 11 which also carry a main frame, generally indicated by 12, pivoted at the rear of the truck frames and supported at the forward end of said frames by an equalizer bar, usually a heavy spring (not shown).

Each cylinder 6, there being one on each side of the tractor, is connected by a link 13 to a pin 14 which also carries a link 16. Link 13 and curved link 17 are welded together. The link 16 is connected to a bracket 18 mounted on the truck frame while the curved link 17 has a shaft 19 passing through its curved end. This shaft 19 is supported in brackets 21 on the main frame and keyed to the shaft are arms 22 to which the piston rods 7 are connected by bifurcated clevises 23.

Links 24, adjustable in length, extend forwardly from arms 22 to one arm of bellcranks 26 and serve to rock bell cranks 26 about pins 27 which support them on plate brackets 28 on the truck frames. Clevises 29 are secured to the other arm of the bellcranks. Rods 31 slide through the clevises and are secured by pins 32 between extensions 33 on angle frame members 34. Each rod 31 is surrounded by a spring 36 compressed thereon between the clevis 29 and the other end of the rod. Each rod has an internally threaded sleeve 37 thereon sliding in the clevis, the end of the sleeve having a head 38 thereon sliding in the clevis and acting as a guide between the rod and the clevis. Any upward push on the rods compresses the springs additionally while the head 38 on the sleeves permit the rods to be lifted positively. In this manner, a flexible connection is provided protecting the lifting and lowering mechanism as will appear further.

A tube 41 is provided on each side of the tractor alongside the truck frames. One end of each tube is received by and is welded to a collar on angle frame members 34 while the other end carries a fork casting 42 having an upper and lower slot formed therein. A member 43 is receivable in each casting 42 and is held in place by pin 44. This member closes the slots in the casting 42 and confines a stub shaft 46 in either slot. The stub shaft carries a suitable bearing box 45 which can be inserted in either slot in the forked casting 42. Bracket 18 is mounted on the truck frame as close to the pivot point of the truck on the main frame as the tractor construction permits. (A bracket and stub shaft construction is shown as 96 and 97 in Figure 9 of Buffington Patent 1,859,496 of May 24, 1932). The stub shaft 46 is welded to the bracket 18 and with bearing box 45 provides an extension on said bracket. The term "extension" as used in the claims, refers particularly to the stub shaft 47 extending from the bracket 18, each bracket 18 being secured to a truck frame.

Referring particularly to Figure 3 it is to be noted that the upper slot is above and therefore offset with respect to the adjacent tube or parallel member 41. Similarly the lower slot is offset so that the parallel members 41 can be raised or lowered with respect to the point of their hinge mounting on the tractor.

The angle frame connectors, or members 34, are joined together by a short tube 47 welded to them. The tubes 41, the members 34, and the short tube provide a very strong and rigid U-frame which can be manipulated by rocking of bell cranks 26. This frame lies practically beneath the tractor radiator so that any load placed thereon is carried close in to the tractor; the turning moment of the load is therefore minimized.

This strong and rigid frame is utilized as a support for a mold board 51. This board, as is disclosed in the Patent 1,928,778 to Austin, is composed of a plurality of component parts, primarily a back plate 52, so formed that it is a channel in cross section and carries a front plate 53 of arcuate cross section. In addition, a replaceable cutting blade 54 is suitably secured to the forward lower edge of the plate 53.

Secured to the back plate 52 are two brackets 56 and two other brackets 61. Brackets 56 receive pins 58 which also pass through frame connection members 34, when the mold board is transverse of the tractor. When the mold board is in either of the angular positions of Figure 2, a connector 59 is inserted between the member 34 and the spaced bracket on the mold board.

Additional support for the mold board is provided at each end thereof by brackets 61 and members 62 in the form of tubes which are slidable in tubes 41. Each tube carries an end casting 57 at the end thereof having an off-set aperture (see Figure 4) therein which is engaged by a pin 63 passed through one of the two holes in brackets 61. When the mold board is in the full line position of Figure 2, both end castings are turned in, the left one to engage the pin passed through the inner hole in the associated bracket, and the right one to engage a pin in the outer hole. When the mold board is straight across, the end castings are both turned out to receive pins passed through the inner holes. The path of center of each inner hole is beyond the line of center of the rod by the amount of offset of the aperture in each end casting. Pins 64 are passed through each collar, tube 41 and apertured tube 62 to secure the tube 62.

The frame fork castings 42 can be raised or lowered so that bearing boxes 45 for stub shafts 46 can be located either in the upper or the lower slots to vary the angle of the mold board or in an upper slot on one side and a lower slot on the other to give an angle to the mold board. To do this it is merely necessary to lower the mold board onto the ground, pull pins 44, back the tractor away to remove the stub shafts from the slots, raise or lower the frame as desired, and then move the tractor forward and carry the stub shafts into the desired slots in the fork castings 42, or the device may be entirely disconnected from the tractor by removing pins 32 and 44 and backing the tractor, as mentioned.

It is to be noted that in the main the earth mover is carried on the truck frames and that whatever load of the earth mover is placed on the main frame is at a point to the rear of the equalizer bar.

Instead of utilizing hydraulic mechanism and a pump, electric power can be used as is disclosed in the aforementioned Austin patent.

It is to be noted that tubes 41, 62, and 47 and connections 34 form a U-frame rather than a V or an A frame. This form of the frame enables the tool as the mold board or other earth moving or displacing means, to be carried very close in to the dirigible vehicle as well as to permit the tool to be secured to the frame rigidly even though the position of the tool on the frame can be adjusted. In practice, this construction has proven of utility and advantage.

I claim as my invention:

1. An earth mover for a tractor having truck frames, comprising an extension on each truck frame, members extending parallel to and alongside of each truck frame, and an end member on each parallel member, means on each end member providing a plurality of receptacles for said extension.

2. In an earth moving device including a tractor support means, a shaft on each tractor support means, bearing means on each shaft, a frame extending forwardly of said tractor and having opposite legs, and a member on an end of each leg providing a plurality of receptacles for said bearing means.

3. An earth mover for mounting on a tractor having truck frames, said mover comprising a member mounted on each truck frame, a shaft on each member, a box-like bearing on each shaft, a blade support including a member extending parallel to each truck frame, and a receptacle member on an end of each of said parallel members to receive an associated box-like bearing in any one of a plurality of different elevated positions of said parallel member.

4. An earth mover for attachment to a tractor having a pair of parallel but spaced truck frames, said mover comprising a pair of brackets, means securing each of said brackets to a truck frame near the rear end thereof, a stub shaft secured to and projecting from each of said brackets, a bearing secured to and carried by each shaft, means retaining said bearing in place on said shaft, frame members extending parallel to and alongside of each truck frame, a receptacle member mounted on an end of each of said frame members and having a plurality of slots therein for receiving an associated bearing, each of said receptacle members being mounted on its frame member with said slots off center with respect to said frame member, and means for retaining said bearing in said receptacle member with said bearing in any one of said slots.

5. An earth mover for attachment to a tractor having truck frames, said mover comprising a pair of brackets, means securing each of said brackets to a truck frame near the rear end thereof, a stub shaft secured to and projecting from each of said brackets, frame members extending parallel to and alongside of each truck frame, a receptacle member mounted on an end of each of said frame members and having a plurality of slots therein providing receptacles for its associated shaft, said receptacle member being mounted with said slots off center with respect to its associated frame member to provide for rotative reception in said receptacle member of an associated shaft in a plurality of positions of said shaft with respect to said member, and means for retaining said shaft in said receptacle member.

JOHN F. KNAPP.